United States Patent
Bakish et al.

(10) Patent No.: US 9,536,523 B2
(45) Date of Patent: *Jan. 3, 2017

(54) METHOD AND SYSTEM FOR IDENTIFICATION OF SPEECH SEGMENTS

(75) Inventors: Tal Bakish, Modiin (IL); Gavriel Horowitz, Misgav (IL); Yekutiel Avargel, Ashkelon (IL); Yechiel Kurtz, Haifa (IL)

(73) Assignee: VOCALZOOM SYSTEMS LTD., Yokneam Illit (IL)

( * ) Notice: Subject to any disclaimer, the term of this patent is extended or adjusted under 35 U.S.C. 154(b) by 306 days.

This patent is subject to a terminal disclaimer.

(21) Appl. No.: 14/128,655

(22) PCT Filed: Jun. 21, 2012

(86) PCT No.: PCT/IL2012/000254
§ 371 (c)(1),
(2), (4) Date: Dec. 23, 2013

(87) PCT Pub. No.: WO2012/176199
PCT Pub. Date: Dec. 27, 2012

(65) Prior Publication Data
US 2014/0149117 A1 May 29, 2014

Related U.S. Application Data

(60) Provisional application No. 61/499,759, filed on Jun. 22, 2011.

(51) Int. Cl.
*G10L 15/187* (2013.01)
*G10L 15/04* (2013.01)
(Continued)

(52) U.S. Cl.
CPC ............. *G10L 15/187* (2013.01); *G10L 15/24* (2013.01); *G10L 25/78* (2013.01); *G10L 25/90* (2013.01)

(58) Field of Classification Search
CPC .......... G10L 15/04; G10L 15/20; G10L 15/22; G10L 15/187
(Continued)

(56) References Cited

U.S. PATENT DOCUMENTS 9,311,928 B1 * 4/2016 Avargel ............. G10L 21/0208
2004/0133421 A1 7/2004 Burnett et al.
(Continued)

FOREIGN PATENT DOCUMENTS

WO 8704294 A1 7/1987

OTHER PUBLICATIONS

Avargel et al. "Speech Measurements Using a Laser Doppler Vibrometer Sensor: Application to Speech Enhancement", IEEE, May 2011, pp. 109-114.*
(Continued)

*Primary Examiner* — Pierre-Louis Desir
*Assistant Examiner* — Seong Ah A Shin
(74) *Attorney, Agent, or Firm* — Eitan, Mehulal & Sadot (57) ABSTRACT

A system for distinguishing and identifying speech segments originating from speech of one or more relevant speakers in a predefined detection area. The system includes an optical system which outputs optical patterns, each representing audio signals as detected by the optical system in the area within a specific time frame; and a computer processor which receives each of the outputted optical patterns and analyses each respective optical pattern to provide information that enables identification of speech segments thereby, by identifying blank spaces in the optical pattern, which define beginning or ending of each respective speech segment.

20 Claims, 3 Drawing Sheets

(51) Int. Cl.
*G10L 15/20* (2006.01)
*G10L 15/22* (2006.01)
*G10L 15/24* (2013.01)
G10L 25/78 (2013.01)
G10L 25/90 (2013.01)

(58) Field of Classification Search
USPC .................. 704/207, 226, 233, 254, 248
See application file for complete search history.

(56) References Cited

U.S. PATENT DOCUMENTS

| | | | |
|---|---|---|---|
| 2004/0225493 A1* | 11/2004 | Jung | G10L 25/90 704/207 |
| 2008/0314155 A1* | 12/2008 | Blackmon | G01H 5/00 73/649 |
| 2009/0097681 A1* | 4/2009 | Puria | H04R 25/405 381/318 |
| 2009/0216535 A1* | 8/2009 | Entlis | G10L 15/02 704/254 |
| 2010/0280826 A1* | 11/2010 | Bakish | G01H 9/00 704/226 |
| 2011/0054892 A1 | 3/2011 | Jung et al. | |
| 2011/0208520 A1* | 8/2011 | Lee | G10L 25/78 704/233 |
| 2013/0246062 A1* | 9/2013 | Avargel | G10L 25/90 704/233 |
| 2014/0278389 A1* | 9/2014 | Zurek | G10L 15/20 704/231 |
| 2014/0278395 A1* | 9/2014 | Zurek | G10L 15/065 704/233 |

OTHER PUBLICATIONS

Cohen, "Noise Estimation by Minima Controlled Recursive Averaging for Robust Speech Enhancement", IEEE, 2002. pp. 12-15.*
Dekens et al., "Improved Speech Recognition in Noisy Environments by Using a Throat Microphone for Accurate Voicing Detection", EUSIPCO, 2010, pp. 1978-1982.*
Brueckmann et al., "Adaptive Noise Reduction and Voice Activity Detection for improved Verbal Human-Robot Interaction using Binaural Data", IEEE, 2007, pp. 1782-1787.*
Yequtiel Avargel et al; "Speech Measurements Using a Laser Doppler Vibrometer Sensor: Application to Speech Enhancement" HSMCA pp. 109-114. (2011).

* cited by examiner

METHOD AND SYSTEM FOR IDENTIFICATION OF SPEECH SEGMENTS

CROSS-REFERENCE TO RELATED PATENT APPLICATIONS

This application claims the benefit of provisional patent application No. 61/499,759 filed on Jun. 22, 2011, which is incorporated herein by reference in its entirety.

FIELD OF THE INVENTION

The present invention generally relates to voice activity detection and more particularly to voice activity detection for identification of speech segments such as phonemes, syllables and the like, by using analysis of detected audio signals.

BACKGROUND OF THE INVENTION

Speech recognition is a technical field which encompasses various techniques and systems for identifying human speech from received audio signals and may also include identifying words sequences from those signals for allowing identifying the content of the detected speech. Automatic identification of words spoken by one or more speakers in an area, in which audio signals are picked, is a challenging task, typically done using sophisticated identification engines that can recognize phonemes, syllables and semi-syllables of a specific language.

A phoneme is defined as the smallest segment of sound that is produced when speaking. Most languages only include a much limited number of possible phonemes than other speech segments such as, for instance, the number of possible syllables of the specific language and therefore word identification is usually done using phoneme identification.

Speech recognition engine and/or algorithms usually receive an audio signal pattern of the detected sound and analyze the signal pattern both for speech recognition as well as for identification of phonemes.

In some speech recognition systems it is very difficult to identify each phoneme in a maximal certainty and often each segment in the audio pattern is associated with more than one optional phoneme that may fit the sequence. This is caused due to various factors that influence the identification quality such as (i) the sound quality of the audio signal, which can depend on noise and the quality of noise reduction as well as the number of speakers in the area speaking simultaneously etc; (ii) the language; (iii) the analysis algorithm; and the like. It is often very difficult to identify where one word ends and another one begins especially when several speakers are speaking simultaneously in continuous speech. Some word identification engines use probability calculations in which a phoneme is selected out of several optional ones according to its probability to exceed its previous detected phoneme or word. For example, if the already identified preceding word is "I" and the optional next phonemes are "ah" or "ee" than it is much more likely that "ah" is the right next phoneme for making up the word "am". The systems often use one or more data sources such as vocabularies of words, syllables and phonemes where each must include an indication of the interrelations between probable sequential words segments (such as phonemes and/or syllables). This leads to many complicated algorithms that rely upon linguistic studies and statistics of phonemes, syllables and\or word combinations of each language and therefore these algorithms take up a considerable storage space, and calculation time and often fail to output a word sequence that makes sense if the audio signal is noisy, or if a slightly unusual word combination and phrasing are used.

Most of the speech identifying tools for words identification are extremely sensitive to noise.

Therefore, noise reduction is often carried out prior to identifying the speech segments content from the audio signal. A Voice Activity Detection (VAD) for reducing noise that is unrelated to speech for providing noise robust audio signals for word identification. For example, in an article by Tomas Dekens et. al (Dekens Tomas, Werner Verhelst, Francois Capman and Frederic Beaugendre, "Improved speech recognition in noisy environments by using a throat microphone for accurate voicing detection," in 18*th European Signal Processing Conference (EUSIPCO)*, Aalborg, Denmark, August 2010, pp. 23-27), audio signals are detected using one or more microphones that are connected to a speaker's vibrating body parts such as the user's throat, mouth etc. VAD is carried out over the audio signals that are detected by the microphones to identify speech in the audio signal. The non-speech part identified in the VAD process are then cut out of the audio signal, resulting in audio files that only represent the identified speech parts thereof.

This technique may improve identification of words in some cases, especially when the speaker is pronouncing separated short words such as counting from 0-10 but may affect the word identification process which is a complicated linguistic analysis if the speaker speaks continuously and freely since some major part of the information is lost when the audio signal is cut. Additionally, when fragmenting a sentence into very small parts, e.g. between words, information relating to articulation and cross word context can be lost. Furthermore, the language model effectiveness decreases since the relations between words is lost.

SUMMARY OF INVENTION

According to one aspect of the present invention, there is provided a system for distinguishing and identifying speech segments originating from speech of at least one speaker in a predefined detection area that includes: (i) at least one optical system which allows transmitting optical signals over the area and receiving reflected signals from this area, where the optical system outputs optical patterns, each such optical pattern represents audio signals as detected by the optical system in the area within a specific time frame and is a frequency vs. time representation thereof; and (ii) a computer processor which receives each of the outputted optical patterns and analyses each respective optical pattern to provide information that enables identification of speech segments thereby, by identification of blank spaces in the optical pattern, which define beginning or ending speech segments.

Optionally, the blank spaces are indicative of time intervals along a respective optical pattern in which the intensity of the signal is lower than a predefined threshold value, indicative that within these time intervals of blank spaces there is no speech and therefor the speech segments are identified as the spaces over time in between the blank spaces. These blank spaces may also be identified as spaces along the time axis of the optical pattern in which no continuous pitch behavior is shown, wherein a speech segment is identified as an area over the optical pattern which shows a set continuous pitches and no-speech areas are identified as areas in which the signal intensity is lower than the predefined threshold and/or areas in which no continuous pitches are identified.

The system may further include an audio system that detects the same audio signals in the same area via at least one audio receiver and outputs an audio pattern of the audio signals detected thereby that corresponds to the optical pattern of the same time frame, wherein a processor allows using the optical pattern for improving speech segment identification of the respective corresponding audio pattern.

The processor optionally operates a Voice Activity Detection (VAD) module which detects voice activity in the respective corresponding audio detection pattern by identifying correlations between the optical pattern and the corresponding audio pattern.

Optionally, the processor further calculates a probability factor for each identified speech segment and/or for each identified beginning and ending of a speech segment, where the probability factor is indicative of an estimated probability of the respective identified location to be a location of a respective segment, segment beginning or segment ending. The processor may enable outputting data indicative of location of speech segments and their associated probability factors.

Optionally, the outputted data is stored in at least one data storage.

Additionally or alternatively, the outputted data is transmitted to at least one separate processor operating a speech recognition engine for allowing the indication of the speech segments to enhance speech recognition analysis thereof.

According to some embodiments, the optical system includes a laser vibrometer that receives and transmits coherent optical signals for detecting vibrations of speakers' vibrating surfaces.

According to other aspects of the present invention, there is provided a method for distinguishing and identifying speech segments originating from speech of at least one speaker in a predefined detection area that includes: (i) receiving an optical pattern that represents audio signals as detected by an optical system in this area within a specific time frame, wherein the optical pattern is a frequency vs. time representation of the optically detected audio signal; and (ii) analyzing the optical pattern to provide information that enables identification of speech segments thereby, by identification of blank spaces in the optical pattern, which define beginning or ending of each respective speech segment.

Optionally, the blank spaces are indicative of time intervals along a respective the optical pattern in which the intensity of the signal is lower than a predefined threshold value, indicative that within these time intervals of blank spaces there is no speech and therefor the speech segments are identified as the spaces over time in between the blank spaces.

Additionally or alternatively, the method further includes carrying out a pitch analysis in which speech tones sets are identified, each tones set includes a set of substantially parallel line patterns in the frequency-time representation of the optical pattern, wherein a human speech related pitch is defined as the line-pattern of the lowest frequency range. A speech segment is identified as an area over the optical pattern which shows a set continuous pitches and no-speech areas are identified as areas in which the signal intensity is lower than the predefined threshold and/or areas in which no continuous pitches are identified.

The pitch analysis may include calculating a pitch frequency value of the lowest line-pattern of the respective tones set and calculating harmonious line-patterns thereof for assessing the entire audio signal therefrom, wherein the pitch and harmonies thereof are used to build a comb filter for allowing noise reduction of the audio signal as detected by an audio system for speech related segments identification.

The method may further include detecting audio signals by using an audio system, where the audio system allows detecting the same audio signals in the area via at least one audio receiver and outputting an audio pattern of the audio signals detected thereby that corresponds to the optical pattern of the same time frame, for improving speech segment identification of the respective corresponding audio pattern.

Additionally or alternatively, the method further includes detecting voice activity in the respective corresponding audio pattern by identifying correlations between the optical pattern and the corresponding audio pattern.

Optionally, the method further includes calculating a probability factor for each identified speech segment and/or for each identified beginning and ending of a speech segment, wherein the probability factor is indicative of an estimated probability of the respective identified location to be a location of a respective segment, segment beginning or segment ending.

Additionally or alternatively, the method further includes outputting data indicative of location of speech segments and their associated probability factors.

According to some embodiments, the outputted data is transmitted to at least one separate processor operating a speech recognition engine for allowing the indication of the speech segments to enhance speech recognition analysis thereof.

The optical signal is optionally used as a comb filter for the audio signals detected by the audio system, wherein the identified blank spaces are used for noise reduction in the corresponding audio pattern.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides systems and methods of distinguishing and identifying speech segments originating from speech of one or more speakers in a predefined area, in which audio signals are detected. The speech segments are detected by using an optical system which can optically detect audio signals, e.g. by using a Laser Vibrometer outputting a representation of the audio signals such as frequency vs. time audio pattern for analysis thereof.

A speech segment is any part of a human sound that is used for speech such as a phoneme, a syllable, a semi-syllable, a word, a sequence of words, an/or any other sound part of speech.

According to some embodiments of the present invention, the optical system outputs a representation of detected optical signals which is a representation of the detected sounds (representing detected audio signals). For example, the optical system may output a speed or displacement of a vibrating surface vs. time pattern, which represents the sounds in the area (audio signals) as optically detected by the optical system. This pattern will be referred to hereinafter as "output optical pattern", "optical pattern", or "voice activity representation" and includes a frequency vs. time representation of the signal where the intensity of the signal is represented by a color scale of the pattern lines. The output optical pattern may then be analyzed by one or more analysis modules using one or more computerized systems including one or more computer processors and data storage units, where the processor(s) operate these signal analysis modules.

The analysis may include identifying and distinguishing voice activity of each speaker separately and locating blank spaces in the output pattern. These blank spaces are areas in the pattern in which hardly any signal representation is shown meaning areas in the pattern where the signal is very weak or does not show at all. The analysis may allow detecting and distinguishing speech segments of at least one speaker by identifying voice patterns between the blank spaces as speech segments. This means that the blank spaces time length and location (where they begin and end over a time axis of the pattern) can be identified and used for speech detection.

The identified speech segments may then be used for identification of words of each respective speaker (i.e. speech detection). The identified voice patterns between the blank spaces may be analyzed by analyzing the characteristics of these voice patterns such as analyzing frequency of the signal, its pitch characteristics and the like. The characteristics analysis may be used for several purposes such as, for example (i) for carrying out noise reduction by, for example, identifying which part of the signal is typical of speech (e.g. typical frequency and pitch ranges) and which part is typical of various types of noise (constant noise having one or more steady frequencies, random noise of frequency that is under or above the human speech range limits, etc.); (ii) for identifying one or more speakers (e.g. by identifying typical speech pitch characterizing each speaker, and the like); and (iii) for identifying speech segments by identifying the blank spaces.

Additionally, the optical pattern and blank spaces thereof may be compared to a corresponding audio signal pattern detected by an audio system having one or more audio receivers such as an acoustic microphone for identifying voiced and unvoiced parts. The acoustic microphone is capable of better showing unvoiced phonemes while the optical cannot or can only provide poor quality unvoiced signal pattern.

According to some embodiments of the present invention, the system includes an optical system, which includes a laser Vibrometer, which can transmit coherent optical signals of a known frequency or frequency range, detect reflected optical signals, mainly originating from the transmitted optical signals and identify vibration characteristics of the reflected optical signals by calculating phase shifts over time between the transmitted signals and the reflected ones. This method is well known in the art and commonly used for measuring velocities and vibration of surfaces. In laser vibrometry the coherent optical signals outputted by one or more laser sources are directed at one or more surfaces, where each respective velocity or displacement is extracted from phase shifts between the output optical coherent signals and the detected optical signals reflected from these surfaces.

The phase shifts may allow outputting a first output pattern which includes the velocity or displacement of the reflected signals over time. This first pattern may then be used for extracting the blank spaces for identification of speech segments therefrom. Alternatively or additionally, the first pattern is first used for identification and distinguishing of one or more relevant speakers out of multiple speakers speaking simultaneously, for separating the voice activity pattern of each identified relevant speaker and/or for noise reduction. This process may output one or more second patterns each representing a specific speaker voice pattern of speech which is noise reduced.

Additionally or alternatively, one or more audio systems may be used in addition to the optical system for receiving an audio signal, which may be used for improving extraction of information and noise reduction.

Any one of many available methods and modules that can carry out the noise reduction and/or the identification of relevant speakers may be used such as, for instance, voice activity detection (VAD) methods and modules, pitch detection methods, and combinations thereof. Several efficient such methods and modules are described in U.S. Pat. No. 7,775,113 (B2) and US2010280826 by Tal Bakish et al, which are incorporated by reference herein in their entirety. Bakish describes several systems, processes and configurations in which optical systems such as laser Doppler Vibrometer systems are used for identification and separation of speakers as well as noise reduction using only an optical system for voice detection or the optical and audio systems combined.

According to some embodiments of the present invention, the optical pattern outputted from the optical system is analyzed to identify speech related pitches of the signal, to build a comb filter, for allowing improved noise reduction, while maintaining lower distortion to the speaker signal in the output of the audio system (acoustic signal). In this case, the optical signal is used as a comb filter and reference to the audio system in noisy scenarios. The identified blank spaces in the optical pattern are used for noise reduction in the corresponding audio pattern.

The analysis of the optical pattern for identification of speech related pitches (hereinafter referred to as "pitch analysis") may be carried out by identifying harmonious frequencies (mainly frequency line-patterns in the optical pattern that are substantially parallel to one another referred to hereinafter as "tone sets"). The lowest frequency line-pattern is taken as the pitch where the harmonies thereof can be artificially assets for creating the comb filter thereby or taken/calculated from the measured tone sets by. For instance, the pitch analysis includes calculating a main frequency value of each line-pattern of each such tones set taking the lowest calculated such frequency value as the voice pitch of that particular time frame and the other calculated frequency values as the harmonies thereof.

When executing noise reduction techniques, parts in the acoustic signal that might contain speaker relevant information may be distorted or disappear. Therefore the more noise reduction is performed over the signal; the more the signal of the relevant speaker can be distorted. Distortion harms speech recognition performances and therefore it is crucial to use audio signals detected by an audio system without reducing their noise to the point of losing information thereby, while using the optically detected corresponding audio signal for improving speech recognition performances.

For example, if we have a reliable reference to the speaker signal (in our case the optical reference), we can still do the same Noise reduction level but cause less distortion since we can "guard" the speaker signal from being harmed by the noise reduction (e.g. do noise reduction only in locations where we know there is only noise and no speaker.

Figure 1:
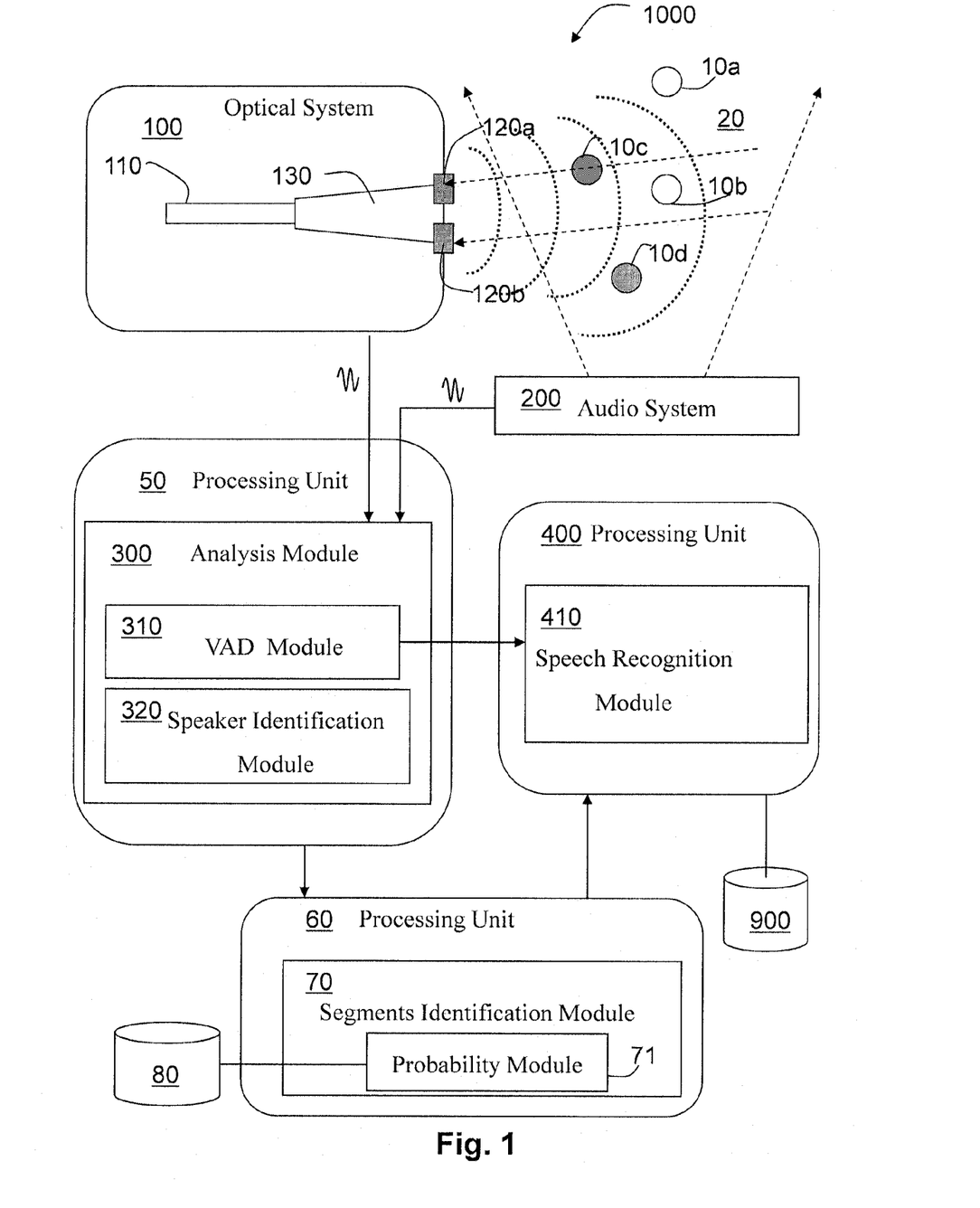
FIG. 1 is a block diagram schematically illustrating a system for detecting speech and for identification of speech segments, using an optical system for detecting audio signals thereby, according to some embodiments of the present invention.

Reference is now made to FIG. 1, which schematically shows a system 1000 for voice detection and speech segments identification, according to some embodiments of the present invention. The system 1000 includes an optical system 100, which transmits optical signals over a predefined detection area 20 and receives reflected signals therefrom. The detection area 20 may be any predefined area that includes one or more speakers and can possibly include one or more noise sources. For example, the area 20 illustrated in FIG. 1, includes two speakers sound sources 10a and 10b and two noise sound sources 10c and 10d.

The optical system 100 may include one or more laser Vibrometers, which can output data indicative of a first pattern of the detected voice activity in the area 20. The first pattern may be a representation of the velocity or displacement of the detected vibrations extracted from the phase shifts over time. According to some embodiments of the present invention, the laser of the Vibrometer of the optical system 100 may include at least one optical transmission unit 110 which enables transmitting coherent optical signals over the detection area 20 and one or more detectors 120a and 120b that can receive and detect optical signals reflected from the area 20.

According to some embodiments of the present invention, the transmission unit 110 may be directed at one or more vibrating surfaces in the area 20 such as human speakers' mouth and/or larynx area and/or other body or non-body surfaces, which create acoustic vibrations that correspond to those made by the speakers in the area 20 such as walls, window shields and the like, located in the area 20.

Additionally or alternatively, the optical system 100 enables covering the area 20 by providing a scanner unit 130 which directs the transmitted coherent signals to a different direction at each given time interval. Respectively, the detectors 120b and 120b allow detecting signals arriving from multiple directions and therefore multiple speakers and/or moving speakers, by being arranged in a spatial configuration that allows each detector to cover a portion of the area 20 and/or by being able to face different directions by moving for receiving optical signals arriving from different directions.

According to some embodiments of the present invention, the optical system 100 is directed to one or more predefined relevant speakers and optically measures physical vibrations of the relevant speaker (i.e. vibrations of the larynx area, the mouth area, or both). A different output signal pattern for each speaker is automatically produced by the optical system 100 at each given time period for allowing further analysis for segments identification and voice activity detection. An optically measured such output signal pattern of a relevant speaker counting from one to ten in English while another irrelevant speaker disturbs the relevant one by speaking simultaneously with the relevant speaker, is shown in FIG. 2B.

According to some embodiments of the present invention, as illustrated in FIG. 1, the system 1000 additionally includes an audio system 200. The audio system 200 may include one or more audio receivers such as microphones, located in the detection area 20, for receiving audio signals of sound in the detection area 20. The audio system 200 may output either data indicative of all received audio signals detected thereby in the area 20 or data that has been processed, for instance, for noise reduction and voice activity detection (VAD).

According to some embodiments of the present invention, the system 1000 further includes an analysis module 300 operated by one or more processing units such as processing unit 50, and a segments identification module 70, operated by the same or by a different processing unit such as processing unit 60. Each processing unit may be any hardware and/or software unit that can carry out data analysis and processing and may be embedded in one or more computerized systems such as a PC (Personal Computer), a PDA (Personal Digital Assistant) device, a laptop and the like.

The analysis module 300 may receive data from the optical system 100 such as the output pattern representing velocity or amplitude set of the detected audio signals of a known relevant speaker and the audio signal pattern from the audio system 200 and analyze this data for carrying out noise reduction, identification of speech speakers, segments identification, voiced or unvoiced detection, pitch detection and for phoneme detection directly from the output pattern.

According to some embodiments of the present invention, as shown in FIG. 1, the analysis module 300 includes a voice activity detection (VAD) module 310 and a speaker identification module 320.

The VAD module 310 detects when the pattern of the optical and/or the audio signal includes human speech and when only noise is received. There are many VAD based detection algorithms and methods known in the art that can be used for identifying human speech. These algorithms typically use classification rules for classifying a pattern part as speech or non-speech such as threshold limits.

According to some embodiments of the present invention, the VAD module 310 receives an optical detection pattern representing the detected optical signals from the optical system 100 and a corresponding audio detection pattern representing the audio signal from the audio system 200 both relating to the same period of time in which sound is detected in the detection area 20. The VAD module 310 may detect voice activity in the audio detection pattern by locating correlations between the pattern provided by the optical system 100 (referred to hereinafter as the "optical pattern") and the corresponding pattern provided by the audio system 200 (referred to hereinafter as "the audio pattern"). These correlations may be only areas in which the audio pattern and/or the optical pattern show signals that has human speech characteristics in frequency and time.

According to some embodiments of the present invention, the speaker identification module 320 enables identifying one or more speakers that are "relevant" meaning that they are the main speakers in a speaking session in the audio pattern using information from the optical pattern. The speaker identification may be carried out by identifying patterns characteristics correlations between the optical pattern and the audio pattern. This means that all areas in the audio pattern in which a voice activity was detected by the VAD module 310 are analyzed to see if a characterizing pitch can be identified in most of these areas. If such characterizing pitch is identified, areas of voice activity that are not characterized by this pitch may be regarded and/or indicated as "non-speech" as they are identified as speech of a different speaker or as an area in which the voice activity detection was an error.

According to some embodiments of the present invention, this process, carried out by the analysis module 300, produces the following outputs: (i) data including indications of the voice activity areas in the audio pattern and the characterizing pitch of the speaker; (ii) the original optical and audio patterns; and/or (iii) an improved audio pattern, which may be a cleaner version of the audio pattern—noise reduced and having the signal indication in the identified non-speech areas completely removed/cut from the original audio pattern.

Many algorithms, methods and applications can be used to carry out the process of relevant speaker identification and of producing a relevant speaker pattern which represents voice activity of the relevant speaker only. Some of these methods are described in the patent and patent application by Bakish, mentioned above, such as speaker identification by detecting voice pitch frequency or VAD that is typical to each speaker, and the like.

According to some embodiments of the present invention, the system 1000 further includes a segments identification module 70, which may be operated by another processing unit 60. The segments identification module 70 receives the optical pattern outputted by the optical system 100 and the equivalent audio pattern outputted by the audio system 200 and analyzes the optical pattern to identify speech segments. The term "equivalent" is used herein to indicate that both the optical pattern and the audio pattern represent the sound detected in the area 20 within the same time frame.

The segments identification module 70 analyzes the optical pattern to identify beginning and ending of speech segments (also referred to in this document as "segments' borders") along the time axis thereof such as phonemes, syllables, sentences and/or words and indicates the locations of each identified segment border and optionally one or more associated characteristics of each such segment border ands/or each identified speech segment such as, for example, a probability factor associated with a segment indicative of the probability of this segment to be a speech segments and/or a probability factor associated with each border indicative of the probability of the location of the respective border to be a beginning/ending of a speech segment.

The segments identification module 70 may carry out one or more processes to identify one or more characteristics of the optical pattern which indicate segments borders, segments type and the like. These processes may be better understood when referring to FIGS. 2A and 2B to illustrate how the segments borders can be identified and characterized.

Additionally or alternatively, the distinction between voice and unvoiced parts of the optical pattern may be carried out by correlating the audio signal from the audio system 200 and the corresponding optical pattern parts along the time axis. The optical pattern does not have the unvoiced parts while the audio system show both voiced and unvoiced parts.

Figure 2A:
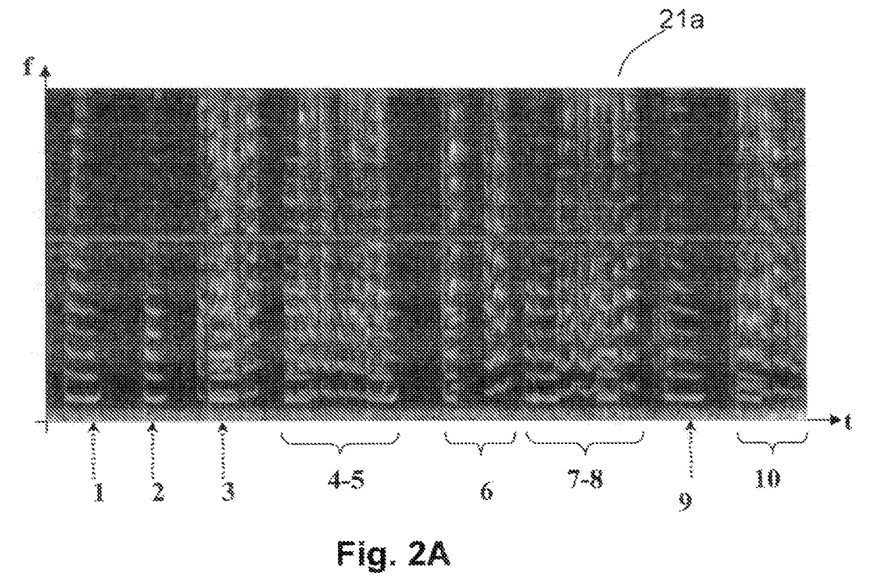
FIG. 2A shows a frequency vs. time representation of a sequence of recorded audio signals of two speakers, speaking substantially simultaneously and counting from one to ten, acquired by an acoustic microphone.
Figure 2B:
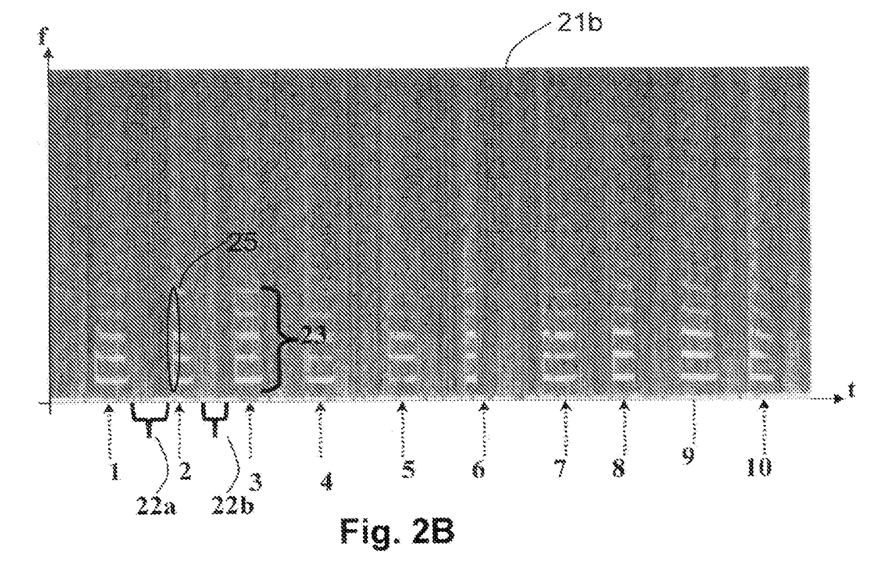
FIG. 2B shows a frequency vs. time representation of a sequence of a recorded of the same two speakers, speaking substantially simultaneously and counting from one to ten, acquired the optical system, according to some embodiments of the present invention.

FIG. 2A shows an exemplary audio pattern 21*a* extracted from an audio system (i.e. an audio microphone) representing a recorded audio session over a specific time frame, in an area including more than one speaker in which one relevant speaker is counting from one to ten in English. FIG. 2B shows an exemplary optical pattern 21*b* of the same audio session detected by an optical system including a laser Vibrometer over the same time frame in the same area. Both patterns are a representation of frequency vs. time.

According to some embodiments of the present invention, the identification of segments' characteristics such as segments borders' location, and/or speech segments' location over the time axis of the optical pattern and may be carried out according to as at least one of the following processes: (i) identifying blank spaces in the optical pattern, i.e. identifying areas in the optical pattern 21*b* along the time axis in which the intensity of the signal is lower than a predefined threshold value such as blank areas 22*a* and 22*b* and optionally also areas in the optical pattern 21*b* that do not show continuous pitch behavior such as blank areas 22*a* and 22*b* indicated in FIG. 2B. As shown in FIG. 2B, speech segments are typically represented by a set of continuous pitches wherein the time interval in which a speech segment is represented is characterized by a set of substantially parallel lines each line representing a substantially continuous signal substantially of the same pitch (main frequency) having a high enough intensity (over the threshold), where the set is a multiplicity of such lines all of the same time-interval, which are referred to hereinafter as a "tone set".

A tone set may be identified when the intensity of at least one continuous pitch exceeds a threshold intensity limit, as shown in FIG. 2B indicated as tone set 23. Therefore, any area in the optical pattern that does not exhibit such continuity behavior of one or more tones may be considered a "blank space", in which the speaker had paused for moving to the next phoneme, syllable, word, sentence etc. or as an unvoiced phoneme if detected in the audio pattern. (ii) Analyzing the shape of each of the continuous pitches in each of the tone sets. Changes in the shape of each such continuous pitch, such as bending of one or more of the tones in the set, are often indicative of segments borders, type and/or content. For example, as shown in FIG. 2B, in tone set 23, some of the continuous pitches are Characterized by having rounded edges, meaning the edges of each such pitch line represents a change in the voice (speech) intensity in each frequency, and therefore, according to some linguistic studies, represents a beginning or an ending of a speech segment such as a phoneme. (iii) Identifying correlations between identified speech segments (whether identified by blank spaces identification and/or by tone sets) in the optical pattern and tone sets in the audio pattern, and identifying only those correlated parts as speech segments, and non correlated parts as unvoiced or voice parts that are unrelated to the relevant speaker's speech.

Each language and in some languages each dialect and/or accent is characterized differently in terms of the tone sets' shapes in relation to speech segments' content and/or borders and therefore the analysis of the characteristics of the optical pattern may be suited to each specific language/dialect/accent.

According to some embodiments of the present invention, the segments identification module 70 further allows associating a probability factor to each identified segment border/blank space and/or segment indicative of the probability of the identification to be accurate.

According to some embodiments of the present invention, the segments identification module may include a probability module 71, which associates one or more probability values to each blank space, segment and/or segment border. To do so, the probability module 71 may be required to access one or more data storages including accumulated statistical data such as statistics database 80, to associate characteristics of each identified segment to an appropriate probability factor. These characteristics may include, for example, the segment's length (in time), the length (in time) of blank spaces preceding and/or exceeding the segment, segments' shapes, interrelations between those characteristics, and the like. The probability association may depend upon several parameters such as the signal quality—i.e. the number of measures over a period of time. In cases of a low quality measure, the tone sets may be achieved using extrapolations due to the poor number of measured points building up the frequency lines and therefore both the edges as well as the shape of the frequency values which make out the tone set may be distorted and hence cause the tone set to be associated with a lower probability than, for instance, that of a tone set achieved by high quality measures.

Additionally or alternatively, the probability factor assigned to each identified segment and/or segment border may be calculated according to correlation between the optical pattern and the audio pattern. For example, since each optical pattern represents a specific speaker, all signal representation such as tone sets that appear in the audio pattern along time intervals in which blank spaces are identified in their equivalent intervals in the optical pattern may be checked to determine how their borders are defined (meaning whether it is possible to distinguish a pause in the speech). The probability factor of each interval in the optical pattern identified as a speech segment may be calculated according to the signal intensity in the border areas of the equivalent interval in the audio pattern. In this way if the audio pattern also shows a speech pause in the borders of the same time interval in which a speech segment was identified in the optical pattern, meaning a blank space or a weaker signal is identified in the audio pattern, than the probability of the identified segment or border to be located according to the locations identified in the optical pattern is higher than if these borders were not distinguishable in the audio pattern.

The data outputted by the segments identification module 70 may include indications of the locations over the time axis of all identified segments characteristics such as segments' borders, blank spaces, segments duration, pitches' shape in each tone set, and/or and the like, as well as indication of each probability factor associated with each of the indicated segment and segment characteristics. This data serves as added information accompanying the audio pattern associated therewith allowing, for example, other linguistic systems/modules/algorithms such as speech recognition engine 410 to use this added information to identify and/or improve identification of the content of the speech by identifying the content (i.e. the actual phonemes/syllables/words, etc.) of the segments.

According to some embodiments of the present invention, the speech recognition module 410 also receives the audio pattern of the audio signal as detected by the audio system 200 or the cleaned version thereof after VAD or after any type of noise reduction thereto.

According to some embodiments of the present invention, the probability associated with each identified speech segment and/or border may be calculated according to a correlation ratio between the identified speech segments location in the optical pattern and the characteristics of in the audio pattern (e.g. tone sets therein). If the correlation between the part of the optical pattern with an equivalent part of the audio pattern is high then a high probability may be assigned to the speech segment and/or border identified and vice versa.

The characteristics of the segments identified and indicated by the segments identification module 70 may not only relate to the location of the segments along the time axis but may also relate to the content of the segment. For example, the shape of each of the continuous pitches in the tone set may be indicative of the segment's content and not only of its existence and location (e.g. beginning and ending) over the time axis and therefore may be used by the speech recognition module 410 for segment content identification as well.

The speech recognition module 410 may be operated by one or more processing units such as processing unit 400 using one or more computerizes systems. According to some embodiments of the present invention, the speech recognition module 410 uses the segments characteristics indications and their associated probability values to determine the exact beginning and ending of each segment for allowing improving accuracy in determining the content of each of the speech segments in relation to the sequence of already identified speech segments (also called "phonetic context). This means that if a previous set of words or syllables were already identified the speech recognition module 410 determines the next speech segment according to the previously recognized segment.

The system 1000 according to some embodiments thereof provides information including indications of segments characteristics such as location, borders etc. to any speech recognition module whether embedded in the system 1000 as part thereof or an external one for further speech analysis and segments content identification. Many such linguistic tools are available today such as Nuance VoCon 3200 or HTK, for many languages, accents and/or dialects.

According to some embodiments of the present invention, the system may only include the optical system and the segments identification module for using only the optical pattern for segments' characteristics identification and indication and for indication of probability factors associated therewith. This will allow providing a cheaper and smaller product that can improve VAD, speech and word recognition of any audio system and/or any speech recognition module by enhancing the information relating to segments identification that can be deduced from the audio pattern alone provided by the audio system.

Figure 3:
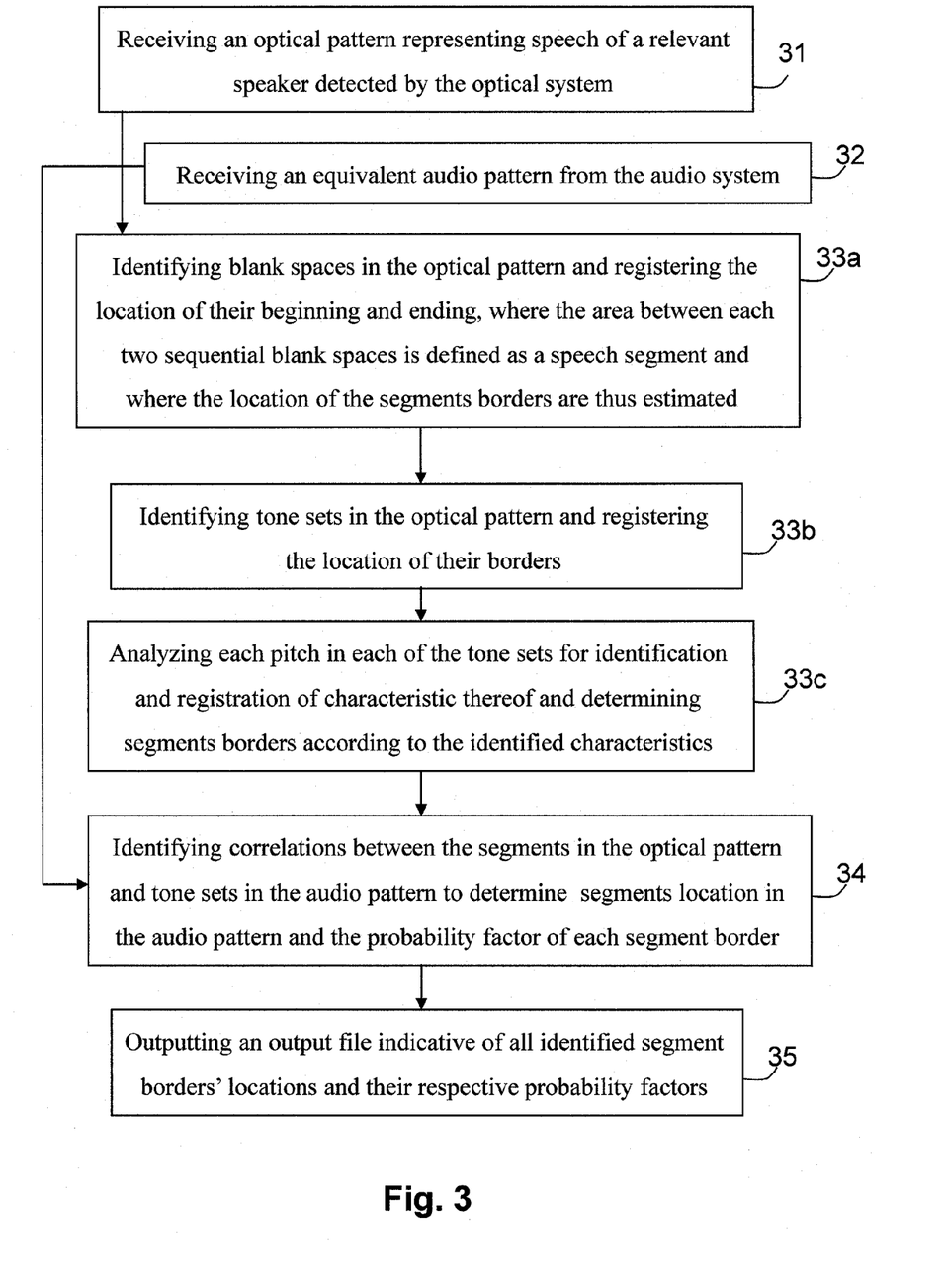
FIG. 3 is a flowchart, schematically illustrating a process of identifying speech segments, using an optical system for detecting audio signals thereby, according to some embodiments of the present invention.

Reference is now made to FIG. 3, which is a flowchart schematically illustrating a process of identifying speech segments, according to some embodiments of the present invention. This process may include receiving an optical pattern representing detected signals within a predefined time period from the optical system 31 and an audio pattern representing detected audio signals within the same equivalent period from the audio system 32. The optical pattern is then processed to identify speech segments' location along the time axis of the optical pattern and their characteristics according to one or more segment identification methods such as, for example:

(i) Identifying blank spaces 33*a* in the optical pattern and the signal representation between each two sequential blank spaces as a speech segment. The location along the time axis of the beginning and ending of the speech segment may be registered and additional information such as the duration of the segment the tone sets of the segment, their shape, the predominant frequency of the segment and other such characteristics. A first probability factor may be calculated and assigned to each of the identified segments and/or each of the borders thereof. The first probability factor may be calculated according to the signal quality, the blank spaces' noise values (e.g. an average or integral intensity/amplitude/energy), statistics relating to the duration of the signal, the predominant frequency and the like.

(ii) Identifying tone sets in the optical pattern 33b where each such set is regarded a speech segment and identifying the borders of each speech segment according to the borders of the pitches in the tone sets, where the borders may be calculated according to a predominant pitch of each tone set, an average location of the borders of all pitches in the tone set, and the like. These borders' locations over the time axis may be registered, as well as other characteristics of each such tone set speech segment such as the duration of the speech segment the tone sets of the segment, their shape, the predominant frequency of the segment and other such characteristics. A second probability factor may be calculated and assigned to each of the identified segments and/or each of the borders thereof. The second probability factor may be calculated according to the signal quality, the number of pitches in each tone set, the variation between the location of each average border and the borders of each of the pitches in the tone set, statistics relating to the duration of the speech segment, the predominant frequency (pitch) and the like.

(iii) Analyzing the shape of the pitches in each tone set 33c, where the ending of each such pitch may be bent. By analyzing the curvature of each such pitch the borders (ending and beginning) of each pitch may be determined and may imply upon the content of the speech segment, and the borders thereof. Additionally or alternatively the curvature shape of the ending and/or beginning of each pitch in the tone set or of the main predominant frequency line may imply the type of the speech segment. For example, a rounded descending pitch ending shape may imply that the phoneme is plosive; a syllable is open and the like. A third probability factor may be calculated and assigned to each of the identified segments and/or each of the borders thereof. The third probability factor may be calculated according to the variation between the location of each average border and the borders of each of the pitches in the tone set, variations between the bending of each pitch in the tone set, statistics relating to the duration of the speech segment, the predominant frequency (pitch) and the like.

Once one or all of the above mentioned methods and/or any other method is used for identifying speech segments in the optical pattern the characteristics and the associated probability factor thereof, the audio pattern may be used for establishing additional fourth probability factor for each identified speech segment and/or its borders 34. The fourth probability factor may be calculated according to correlation between the optical pattern and the audio pattern.

For instance, as mentioned above, the fourth probability factor of each interval in the optical pattern identified as a speech segment may be calculated according to the signal intensity in the border areas of the equivalent interval in the audio pattern (which is proportional to the amplitude in the pattern). Meaning that all signal representation such as tone sets that appear in the audio pattern along time intervals in which blank spaces are identified in their equivalent intervals in the optical pattern are checked in the borders areas for intensity rates to establish how well are these borders defined in the audio pattern. In this way if the audio pattern also shows a distinct speech pause in the borders of the same time interval in which a speech segment was identified in the optical pattern, meaning a blank space in the audio pattern, than the probability of the identified segment to be of than specific length is higher than if these borders were not distinguishable in the audio pattern.

According to some embodiments of the present invention, as illustrated in FIG. 3, the output of this process may be one or more files including indications of at least one of: (1) the locations along the time axis of each of the speech segments and/or segments' borders; (2) the duration of each of the speech segments; (3) the probably factor or factors assigned to each identified border and/or speech segment; and optionally (4) other characteristics of each of the identified speech segment/borders.

The output file may then be used by one or more speech recognition modules for identification of the content of the speech. The information provided by the output of this process may be used for enhancing segments identification which may be carried out in external systems such as the speech recognition module, and the like. This means the speech segments' location identified in this process are used as enhancement information to engines/programs and the like that analyze the audio signal for speech recognition and speech content (word) identification. The external engine may decide according to the probability factor and/or its own analysis of the audio whether to take into consideration the speech segment's location from this process or not. This added information may improve word identification especially in cases where there are multiple speakers in the detection area disturbing the relevant speaker(s), when there are other noise sources such as air condition noise, or any other background noises, and when the relevant speaker speaks in a free continuous manner. The information indicated in the output of the segments identification process can serve as an improving tool for systems that are already identifying content of speech from acquired audio signals by adding information that can assist in the identification of speech segments especially in places along the time axis in which the already provided systems find it difficult to determine the location and characteristics of speech segments.

Therefore, in some configurations, the output may only be retrieved by a speech recognition module only in time periods in which it cannot identify the speech segments location and/or content properly (e.g. if the word/syllable/phoneme sequence does not make sense, or if too much noise is identified, etc.).

The above described process or parts thereof may be carried out in real time or "near real time" as the optical and optionally of the audio systems may output data files or any other data batches every predefined time periods which include the data detected in the area a time period before the outputting moment. This means that the processing of each such data batch may be substantially fast and efficient to allow, for instance, the speech recognition module to output the content of the detected speech substantially in real time or for any other reason.

According to other embodiments of the present invention, a whole speech session may be recorded by the optical system and/or by the analysis unit and/or by any other recording unit, where the analysis for identification of speech segments is carried out offline and not in real time.

According to some embodiments of the present invention, the process of identifying speech segments' location, characteristics and/or probability factors associated therewith, may be carried out using only the optical pattern of each relevant speaker, where the speech recognition module may receive information indicative of all identified speech segments locations, characteristics and/or probability factors and identify the content of the speech therefrom by either using an audio pattern for correlating it with the information from the optical pattern and/or by using only the optical pattern.

The above mentioned process indicates a few methods for identifying speech segments, their characteristics and associated probability factors, for the purpose of illustrating in a non-limiting manner to a person skilled in the art how the invention can be implemented. Any additional or alternative method or methods may be used for identifying the location of the speech segments, their characteristics and the probability factors associated therewith. Any linguistic analysis may be made on the tone sets and their characteristics such as their duration, the shape of each of their pitches, their intensity values and the like to allow identification of speech segments location, characteristics and/or content. Since the science of linguistic in relation to signal analysis is still in development, any currently used and/or new methods to be discovered for analyzing the pattern representing detected sound signals may be used for further improving and/or enhancing the methodology described in this application.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A system for distinguishing and identifying speech segments originating from speech of at least one speaker in a predefined detection area, said system comprising:
   (i) at least one optical system which comprises a Directional Laser Vibrometer (DLV) to use coherent optical signals for detecting vibrations of a vibrating surface of a speaker, and which outputs optical patterns, wherein each said optical pattern represents audio signals as detected by the optical system in said area within a specific time frame and is a frequency vs. time representation thereof; and
   (ii) a processor which receives each of said outputted optical patterns and identifies blank spaces in said optical patterns through analysis of said optical pattern, wherein said blank spaces in said optical patterns define beginning or ending of a respective speech segment, thereby enabling identification of speech segments.

2. The system according to claim 1, wherein said blank spaces are indicative of time intervals along a respective said optical pattern in which the intensity of the signal is lower than a predefined threshold value, indicative that within these time intervals of blank spaces there is no speech and therefor the speech segments are identified as the spaces over time in between the blank spaces.

3. The system according to claim 2, wherein said blank spaces are also identified as spaces along the time axis of the optical pattern in which no continuous pitch behavior is shown,
   wherein a speech segment is identified as an area over the optical pattern which shows a set continuous pitches, and
   wherein no-speech areas are identified as areas in which the signal intensity is lower than the predefined threshold and/or areas in which no continuous pitches are identified.

4. The system according to claim 1, comprising:
   an audio system that detects the same audio signals in said area via at least one audio receiver and outputs an audio pattern of the audio signals detected thereby that corresponds to the optical pattern of the same time frame, wherein a processor allows using the optical pattern for improving speech segment identification of the respective corresponding audio pattern.

5. The system according to claim 4, wherein said processor operates a Voice Activity Detection (VAD) module which detects voice activity in the respective corresponding audio detection pattern by identifying correlations between the optical pattern and the corresponding audio pattern.

6. The system according to claim 1, wherein said processor further calculates a probability factor for each identified speech segment and/or for each identified beginning and ending of a speech segment,
wherein said probability factor is indicative of an estimated probability of the respective identified location to be a location of a respective segment, segment beginning or segment ending.

7. The system according to claim 6, wherein said processor enables outputting data indicative of locations of speech segments and their associated probability factors.

8. The system according to claim 7, wherein said outputted data is transmitted to at least one separate processor operating a speech recognition engine for allowing the indication of the speech segments to enhance speech recognition analysis thereof.

9. The system of claim 1, wherein the system is implemented as:
(A) a hardware-based directional Laser Doppler Vibrometer (LDV), which is associated with
(B) a dedicated hardware circuit that is selected from the group consisting of: Application-Specific Integrated Circuit (ASIC), Field-Programmable Gate Array (FPGA), Digital Signal Processor (DSP).

10. A method for distinguishing and identifying speech segments originating from speech of at least one speaker in a predefined detection area, said method comprising:
(a) at a laser vibrometer of an optical system, (A) using coherent optical signals, detecting vibrations of a vibrating surface of a speaker; and (B) receiving an optical pattern that represents audio signals as detected by said laser vibrometer of said optical system in said area within a specific time frame,
wherein said pattern is a frequency vs. time representation of the optically detected audio signal; and
(b) at a processor associated with said optical system, identifying blank spaces in said optical pattern through analysis of said optical pattern, wherein said blank spaces in said optical pattern define beginning or ending of each respective speech segment, thereby enabling identification of speech segments;
wherein the method is implemented by using (i) said optical system which comprises said laser vibrometer, and (ii) said processor which is associated with said optical system.

11. The method according to claim 10, wherein said blank spaces are indicative of time intervals along a respective said optical pattern in which the intensity of the signal is lower than a predefined threshold value, indicative that within these time intervals of blank spaces there is no speech and therefor the speech segments are identified as the spaces over time in between the blank spaces.

12. The method according to claim 11, comprising:
carrying out a pitch analysis in which speech tones sets are identified,
wherein each tones set includes a set of substantially parallel line patterns in the frequency-time representation of the optical pattern,
wherein a human speech related pitch is defined as the line-pattern of the lowest frequency range,
wherein a speech segment is identified as an area over the optical pattern which shows a set continuous pitches,
wherein no-speech areas are identified as areas in which the signal intensity is lower than the predefined threshold and/or areas in which no continuous pitches are identified.

13. The method according to claim 10, comprising:
detecting audio signals by using an audio system which allows (A) detecting the same audio signals in said area via at least one audio receiver and (B) outputting an audio pattern of the audio signals detected thereby that corresponds to the optical pattern of the same time frame, for improving speech segment identification of the respective corresponding audio pattern.

14. The method according to claim 13, comprising:
detecting voice activity in the respective corresponding audio pattern by identifying correlations between the optical pattern and the corresponding audio pattern.

15. The method according to claim 10, comprising:
calculating a probability factor for each identified speech segment and/or for each identified beginning and ending of a speech segment,
wherein said probability factor is indicative of an estimated probability of the respective identified location to be a location of a respective segment, segment beginning or segment ending.

16. The method according to claim 10, comprising:
outputting data indicative of locations of speech segments and their associated probability factors; and
transmitting said outputted data to at least one separate processor operating a speech recognition engine for allowing the indication of the speech segments to enhance speech recognition analysis thereof.

17. The method according to claim 13, wherein said optical signal is used as a comb filter for the audio signals detected by the audio system,
wherein said identified blank spaces are used for noise reduction in the corresponding audio pattern.

18. The method according to claim 12, wherein said pitch analysis comprises:
calculating a pitch frequency value of the lowest line-pattern of the respective tones set and calculating harmonious line-patterns thereof for assessing the entire audio signal therefrom,
wherein said pitch and harmonies thereof are used to build a comb filter for allowing noise reduction of the audio signal as detected by an audio system for speech related segments identification.

19. The method of claim 10, wherein the method is performed by at least:
(A) a hardware-based directional Laser Doppler Vibrometer (LDV), which is associated with
(B) a dedicated hardware circuit that is selected from the group consisting of: Application-Specific Integrated Circuit (ASIC), Field-Programmable Gate Array (FPGA), Digital Signal Processor (DSP).

20. An apparatus comprising:
a directional Laser Doppler Vibrometer (LDV) which comprises: (i) a laser beam transmitter that transmits an outgoing laser beam towards a target surface, and (ii) a laser beam receiver that receives an incoming laser beam reflected directly from said target surface;
wherein the directional LDV identifies speech segments originating from speech of at least one speaker in a predefined detection area;

wherein the directional LDV uses coherent optical signals for detecting vibrations of a vibrating surface of a speaker, and outputs optical patterns, wherein each optical pattern represents audio signals as detected by the directional LDV within a specific time frame and is a frequency versus time representation thereof;

a controller that comprises at least a hardware component, wherein the controller analyzes each optical pattern and identifies blank spaces in at least one of said optical patterns, and determines that said blank spaces defines a beginning or an ending of a speech segment, thereby enabling identification of speech segments of said audio signals based on said blank spaces in said optical patterns outputted by the directional LDV.

* * * * *